(12) United States Patent
Yanuszka et al.

(10) Patent No.: US 9,505,122 B2
(45) Date of Patent: Nov. 29, 2016

(54) DETACHABLE TOOL KIT AND SHEATH COMBINATION ASSEMBLY FOR CHAINSAW

(71) Applicant: Joshua 2011 LLC, Great Falls, MT (US)

(72) Inventors: Stephen A. Yanuszka, Great Falls, MT (US); John W. Meyer, Seeley Lake, MT (US)

(73) Assignee: Joshua 2011, LLC, Great Falls, MT (US)

( * ) Notice: Subject to any disclaimer, the term of this patent is extended or adjusted under 35 U.S.C. 154(b) by 145 days.

(21) Appl. No.: 14/121,816

(22) Filed: Oct. 20, 2014

(65) Prior Publication Data

US 2016/0214253 A1    Jul. 28, 2016

Related U.S. Application Data

(60) Provisional application No. 61/961,839, filed on Oct. 24, 2013.

(51) Int. Cl.

| | |
|---|---|
| *B27B 17/00* | (2006.01) |
| *B26B 27/00* | (2006.01) |
| *A45C 11/26* | (2006.01) |
| *B25H 3/00* | (2006.01) |
| *B23D 57/02* | (2006.01) |

(52) U.S. Cl.
CPC ............. *B25H 3/006* (2013.01); *B23D 57/023* (2013.01)

(58) Field of Classification Search
CPC ..... B25H 3/006; B23D 57/023; B23Q 13/00
USPC ....... 30/381–382, 296.1–298, 286, 287, 151; 206/16, 349, 308.1, 317, 525, 206/372–373; 224/220, 254
See application file for complete search history.

(56) References Cited

U.S. PATENT DOCUMENTS

| | | | | | |
|---|---|---|---|---|---|
| 2,432,567 | A | * | 12/1947 | Forrest | B27B 17/0008 30/123.4 |
| 2,788,889 | A | * | 4/1957 | Turnbow | B23Q 13/00 206/349 |
| 3,042,087 | A | * | 7/1962 | Otoupalik | B23Q 13/00 30/151 |
| 3,512,631 | A | * | 5/1970 | Braun | B26B 29/025 206/349 |
| 4,037,549 | A | * | 7/1977 | Hanyu | D05B 77/00 112/258 |
| 4,162,004 | A | * | 7/1979 | Thomas | B25H 3/006 206/317 |
| 4,371,079 | A | * | 2/1983 | Dembicks | B27B 17/0008 206/349 |

(Continued)

FOREIGN PATENT DOCUMENTS

| | | | | |
|---|---|---|---|---|
| FR | 2482698 | | 11/1981 | |
| FR | 2482698 | A1 * | 11/1981 | ............. B25H 3/006 |

*Primary Examiner* — Ghassem Alie
*Assistant Examiner* — Bharat C Patel
(74) *Attorney, Agent, or Firm* — Antoinette M. Tease

(57) ABSTRACT

The present invention includes an open-top sheath case for receiving a chainsaw blade and a planar sheath cover detachably secured to the sheath case to cover the open-top of the sheath case. The sheath cover includes an inwardly extending "L" shaped lip along the longitudinal edges of the sheath cover. An open-top tool kit box includes a floor, a pair of side walls and a front and rear end walls extending upwardly from the floor. The tool kit box further includes an outwardly extending lip provided on the upper edges of the sidewalls and the front end wall. The outwardly extending lip of the tool box kit is sized to be slidably received by the inwardly extending lip of the sheath cover.

1 Claim, 6 Drawing Sheets

(56) References Cited

U.S. PATENT DOCUMENTS

| | | | | |
|---|---|---|---|---|
| 4,597,178 | A * | 7/1986 | Dolata | B23D 63/168 30/138 |
| 4,625,783 | A * | 12/1986 | Notaras | B27B 17/00 30/122 |
| 4,989,747 | A * | 2/1991 | Demurger | B65D 21/022 206/349 |
| 5,119,937 | A | 6/1992 | Reynolds, Jr. | |
| 5,662,220 | A * | 9/1997 | Schurman | A45C 11/00 206/317 |
| 5,706,941 | A * | 1/1998 | Erisoty | B26B 29/00 206/349 |
| 5,738,214 | A * | 4/1998 | Wyss | A45C 13/005 206/372 |
| 6,308,419 | B1 * | 10/2001 | Neshat | B26B 29/025 30/151 |
| 6,626,295 | B1 * | 9/2003 | Vasudeva | B25H 3/023 206/373 |
| 6,634,503 | B2 * | 10/2003 | Welsh, Jr. | B26B 29/025 206/349 |
| 6,659,276 | B2 * | 12/2003 | Anderson | B27B 17/0008 206/320 |
| 6,793,074 | B2 | 9/2004 | Anderson et al. | |
| 7,032,749 | B2 | 4/2006 | Hochstetler et al. | |
| 7,984,804 | B2 * | 7/2011 | Lebauer | A45C 11/008 206/234 |
| 8,042,275 | B2 * | 10/2011 | Sergyeyenko | A01G 3/053 30/131 |
| 8,813,374 | B2 * | 8/2014 | Lank | B27B 17/00 30/296.1 |
| 2005/0133393 | A1 * | 6/2005 | Lawrence | A45C 11/00 206/349 |
| 2005/0139499 | A1 * | 6/2005 | Flynn | B27B 17/00 206/349 |
| 2005/0230279 | A1 * | 10/2005 | Brady | B25H 3/006 206/349 |
| 2008/0164400 | A1 * | 7/2008 | Beechinor | B27B 17/0008 248/500 |

* cited by examiner

DETACHABLE TOOL KIT AND SHEATH COMBINATION ASSEMBLY FOR CHAINSAW This application claims the benefit of provisional application Ser. No. 61/961,839 filed Oct. 24, 2013.

BACKGROUND OF INVENTION

An assembly according to the present invention includes a tool kit and sheath combination for use with a chainsaw. The assembly includes a sheath for protecting a chainsaw blade and a tool kit which can be detached from the sheath to allow access to the contents of the tool box.

A chainsaw blade sleeve in combination with a body for holding tool accessories is known such as described in French patent No. FR2482698. The present invention is an improvement over this combination by providing a chainsaw blade sheath detachably connected to a tool box kit. With this new combination the chainsaw can be carried about with the chainsaw blade covered without the necessity of carrying around the tool box kit or the tool box kit can be easily removed from the chainsaw blade sheath for extracting tools or replacement of tools as necessary.

SUMMARY OF INVENTION

The present invention includes an open-top sheath case for receiving a chainsaw blade and a planar sheath cover detachably secured to the sheath case to cover the open-top of the sheath case. The sheath cover includes an inwardly extending "L" shaped lip along the longitudinal edges of the sheath cover. An open-top tool kit box includes a floor, a pair of side walls and a front and rear end walls extending upwardly from the floor. The tool kit box further includes an outwardly extending lip provided on the upper edges of the sidewalls and the front end wall. The outwardly extending lip of the tool box kit is sized to be slidably received by the inwardly extending lip of the sheath cover.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
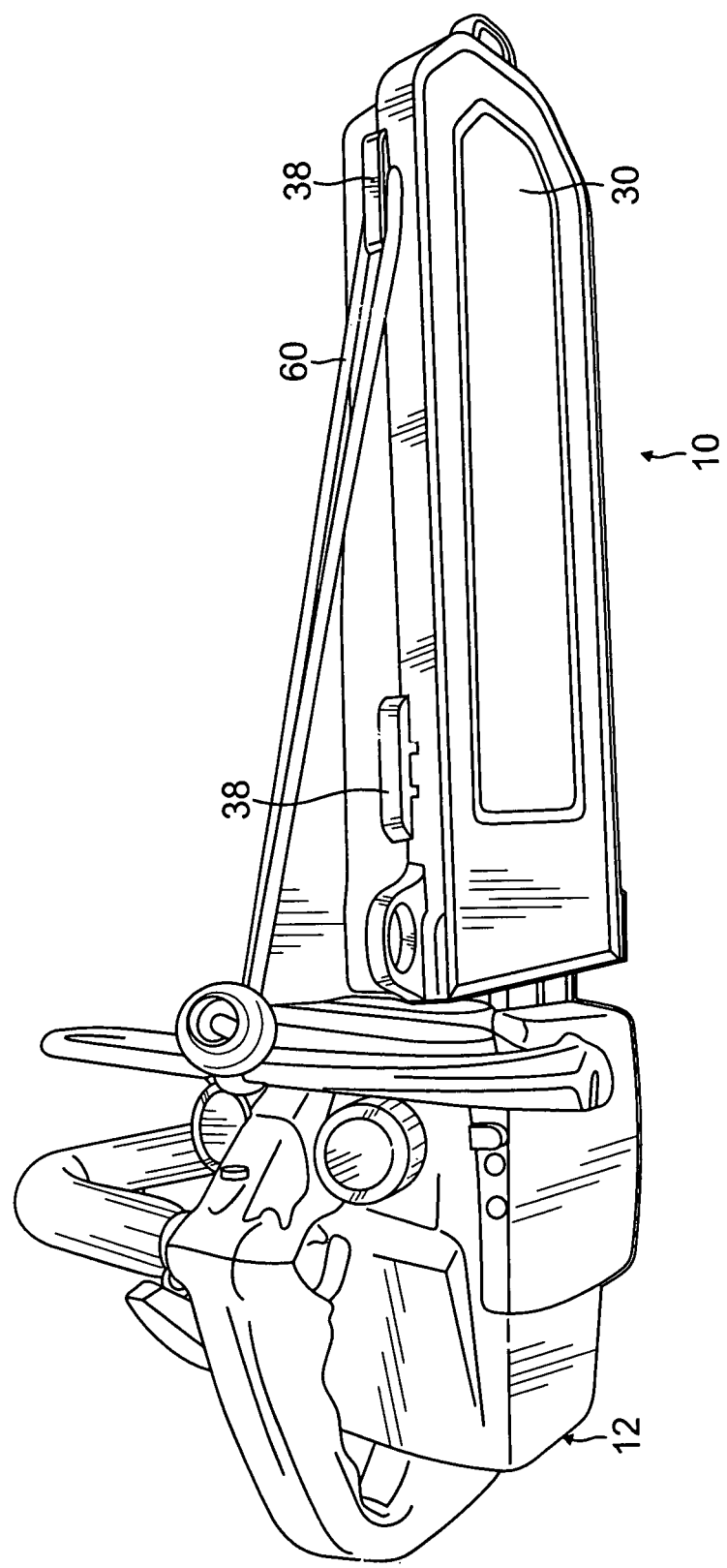
FIG. 1 is an elevational view of the assembly according to the present invention mounted to a chainsaw.
Figure 2:
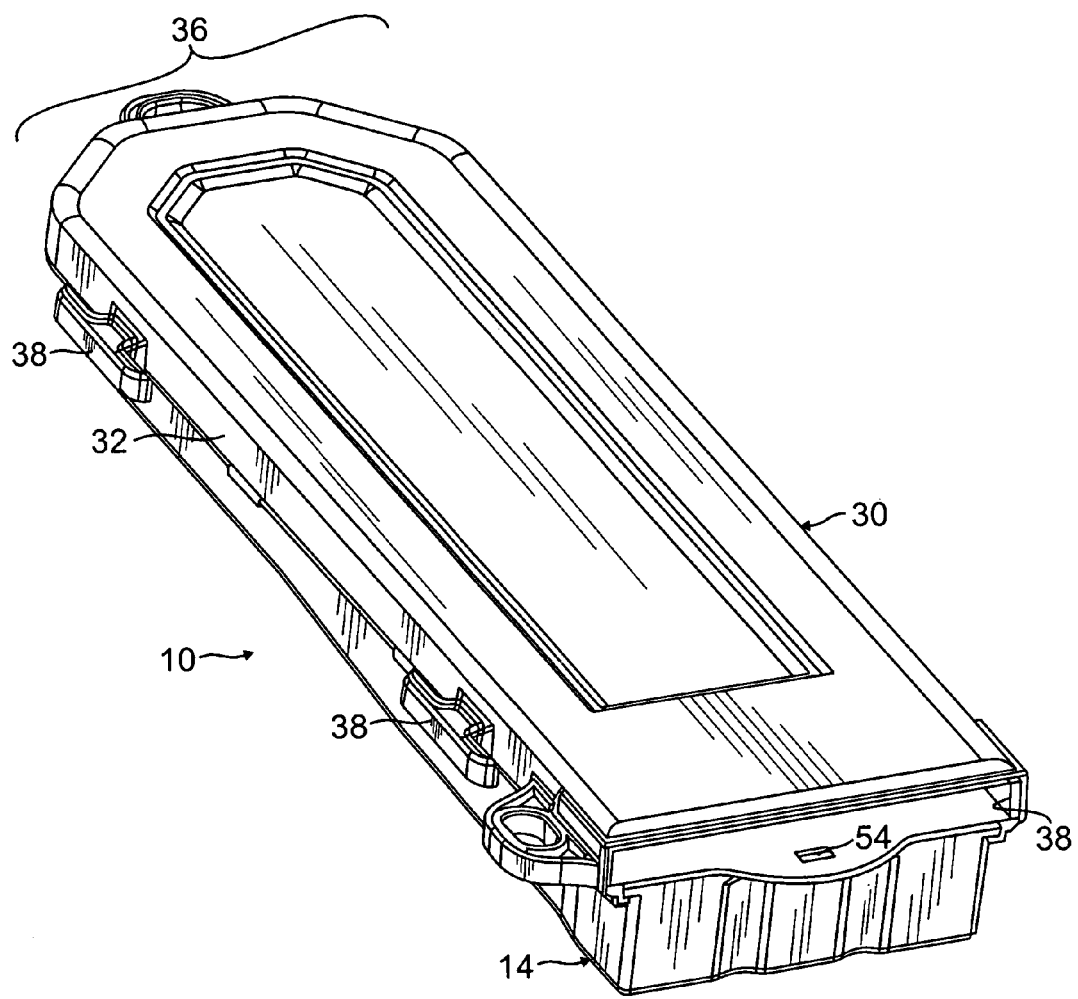
FIG. 2 is a perspective view if the assembly shown in FIG. 1 disconnected from the chainsaw.
Figure 3:
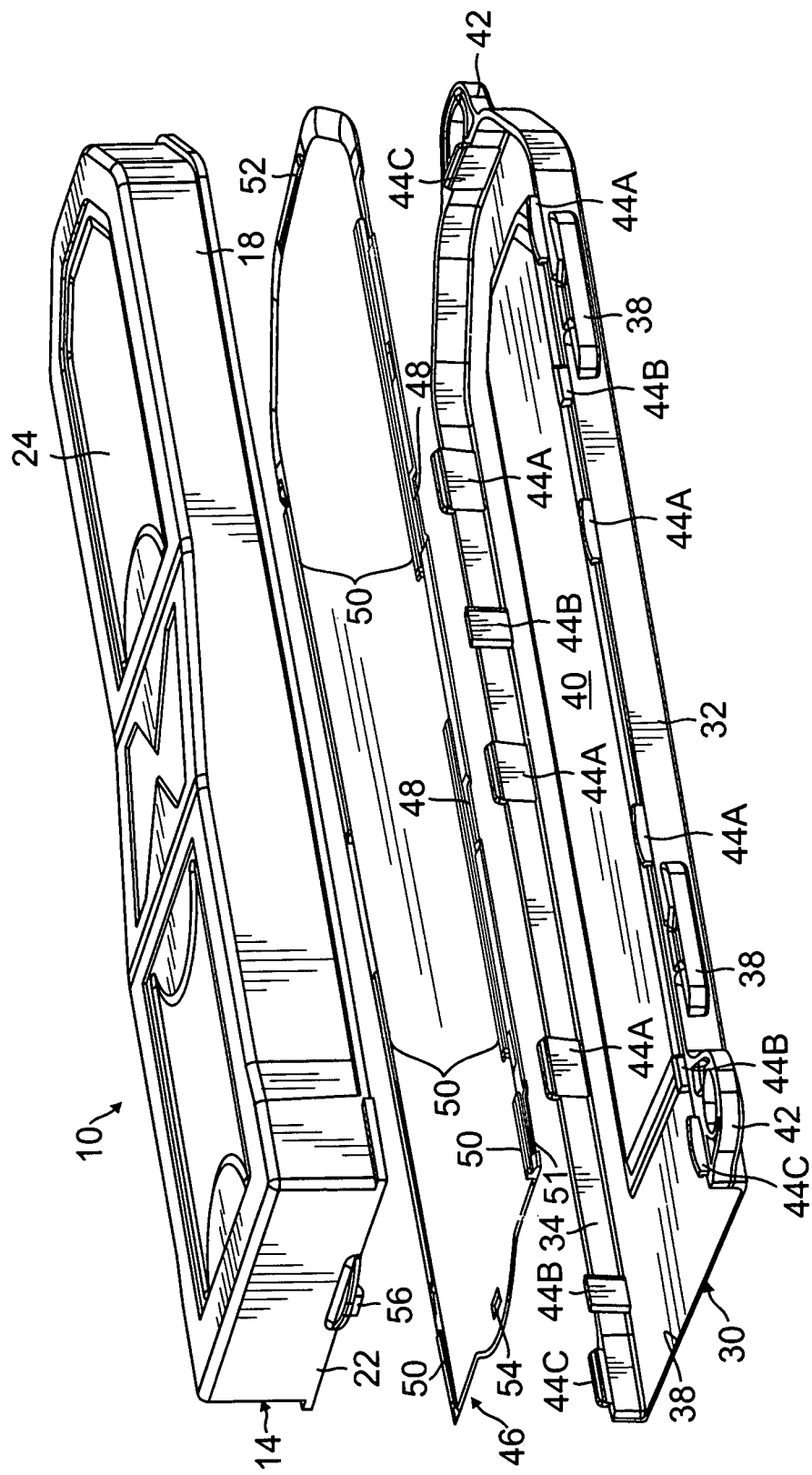
FIG. 3 is an exploded view of the assembly shown in FIG. 2.
Figure 4:
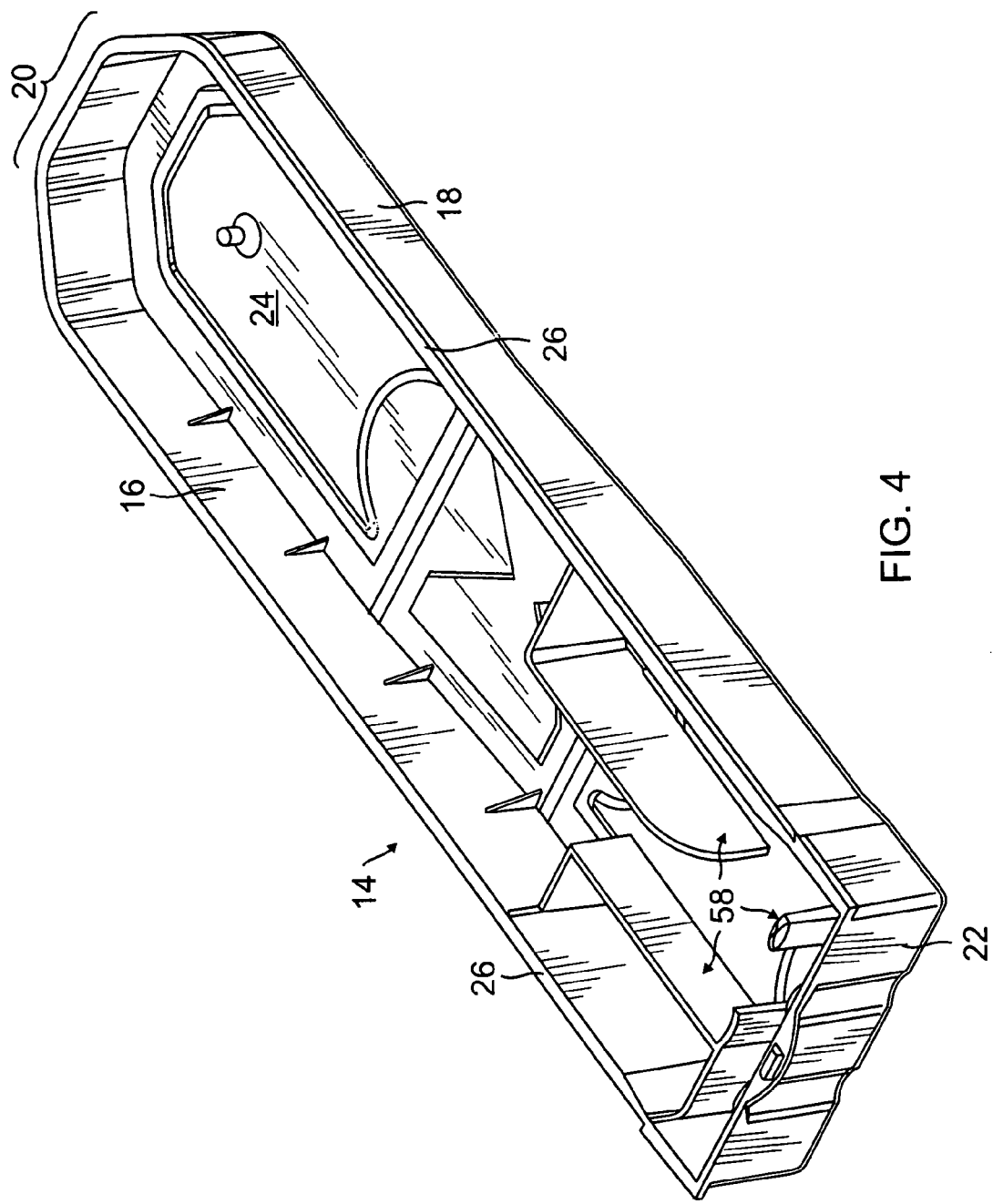
FIG. 4 is a perspective view of a tool box used with the present invention.

A detachable tool kit and sheath combination assembly 10 for use with a chainsaw 12 is shown in FIGS. 1 and 2. The assembly 10 includes an open top tool box structure 14 as shown in FIGS. 3 and 4 having a pair of sidewalls 16 and 18, a shaped end wall 20 and a rear end wall 22. The tool box 14 also has a floor 24 as shown in FIG. 4. An outwardly extending lip 26 is provided around the entire periphery of floor 24.

The assembly 10 also includes a sheath case 30 having a pair of sidewalls 32 and 34, a shaped end wall 36 (shaped as end wall 20) and an open end 38 between the sidewalls 32 and 34. A pair of catch members 38 are secured to sidewall 32 and protrude outwardly. The sheath case 30 is further provided with a floor 40 and a pair of eyelets 42, one mounted to end wall 36 and the other mounted to side wall 32 at an opposite end of the floor 40. The sidewalls 32 and 34 are provided with a plurality of spaced apart tabs 44A extending upwardly from floor 40. A plurality of spaced apart locking tabs 44B are mounted to side walls 32 and 34 and extend upwardly from floor 40. Tabs 44C are provided on the side walls 32 and 34 and the end wall 36 which extend upwardly from the floor 40.

A sheath cover 46 having a flat body 45 includes a shaped end 47 shaped to conform with the shape of the end walls 20 and 36 as shown in FIG. 3. The sheath cover 46 is provided with a plurality of cut outs 48 around the periphery of the flat body 45 which are positioned and sized to receive the tabs 44A of the sheath case 30. A plurality of slots 49 are positioned around the periphery of the flat body 45 sized to receive the locking tabs 44B. Further a plurality of cut outs 51 are positioned at the ends of the flat body 45 sized to receive the tabs 44C.

Figure 6:
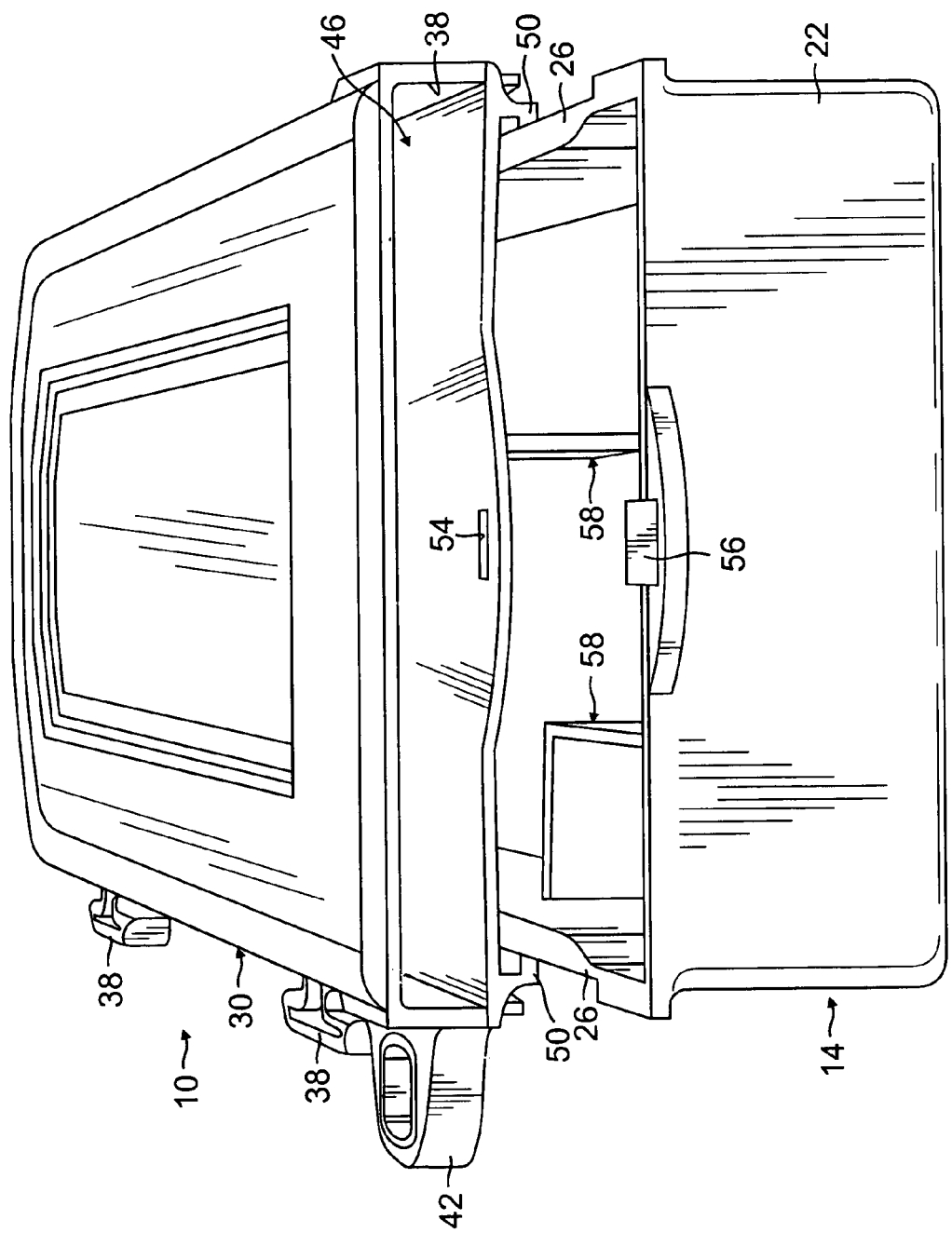
FIG. 6 is an end view of the assembly shown in FIG. 2 with the tool box partially detached.

In a preferred embodiment the tool box 14, sheath case 30 and sheath cover 46 are constructed of a resilient material such as plastic. The sheath cover 46 is then secured to the sheath case 30 by aligning the tabs 44A and 44C with the respective cut outs 48 and 51. The locking tabs 44B are aligned with slots 49 and the locking tabs 44B are sized to frictionally secure the sheath cover to the sheath case 30 when snapped in place. When assembled, the sheath case 30 with sheath cover 46 provide an open end 38 for receiving a blade of a chainsaw 12 as shown in FIGS. 2 and 6.

Figure 5:
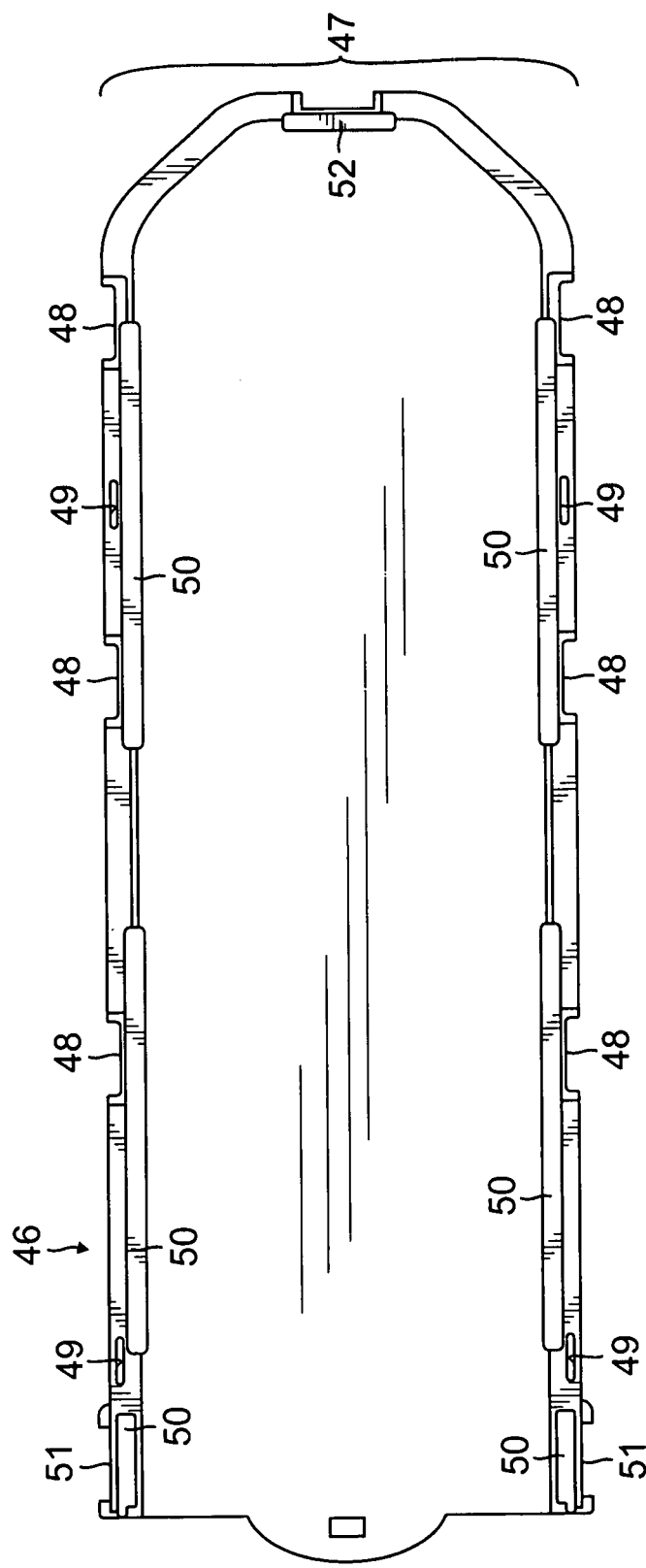
FIG. 5 is a plan view of a sheath cover used with the present invention.

The sheath cover 46 includes an "L" shaped lip 50 extending inwardly along the longitudinal side edges of the sheath cover 46 as shown in FIGS. 3 and 5. The "L" shaped lip 50 is sized to slide over the lip 26 provided in the tool box 14 as shown in FIG. 6.

The assembly 10 is detachably assembled by sliding the forward end of the sheath cover 46 over the tool box 14 with the "L" shaped-lips 50 sliding over the lip 26. An inwardly extending lip 52 as shown in FIG. 5 is mounted at the forward end of the sheath cover 46 and sized to receive the lip 50 at the forward end of tool box 14 to stop the tool box 14 when the shaped end 47 is aligned with the shaped end 20 of the tool box 14. The sheath cover 46 is further provided with a slot 54 sized to receive a tab 56 located on the top of rear end wall 22 of the tool box 14 as shown in FIGS. 2 and 6. When the tool box 14 is fully inserted in the sheath cover 46 the tab 56 is resiliently inserted in slot 54 to secure the shaft cover 46 to the tool box 14.

The tool box 14 includes various tool holder compartments illustrated at 58 shown in FIG. 4 to hold tools associated with the operation and maintenance of the chain saw 12.

A resilient cord 60 as shown in FIG. 1 is used to secure the assembly 10 to the chainsaw 12. In a preferred embodiment the cord 60 is formed in a loop and a ball connector 62 is used to join the free ends of cord 60. The cord 60 has one end looped around one of the catch members 38 and the other end looped around a conventional chain brake 64 provided with chain saw 12. The ball 62 is then threaded between the two sides of the loop to hold the assembly 10 to the chainsaw 12.

In operation the sheath cover 40 is snapped on to the sheath case 30 in the manner described above. If the tool box 14 is not to be used, the sheath case 30 can be mounted to the chain saw 12 with cord 60 after the chainsaw blade has been inserted into the sheath case 30 to protect the chainsaw blade when not being used. If the tool box 14 is to be used, the appropriate tools are placed in the tool box 14 and the tool box 14 slid on to the sheath cover 46 with the lip 26 of the tool box 14 sliding down the lip 50 of the sheath cover 46 and the tab 54 resiliently inserted into slot 54 to secure the tool box 14 in place. With this arrangement, the chainsaw 12 may be transported to a location with the chainsaw blade protected and the tools necessary for operation and maintenance of the chain saw readily at hand. In addition, a resilient cord 60 resiliently attaches the sheath case 30 to the chainsaw to prevent inadvertent slipping of the chainsaw blade out of the sheath case 30.

While the fundamental novel features of the invention have been shown and described, it should be understood that various substitutions, modifications, and variations may be made by those skilled in the arts, without departing from the spirit or scope of the invention. Accordingly, all such modifications or variations are included in the scope of the invention as defined by the following claims:

We claim:

1. A sheath and tool kit combination used with a chainsaw having a chainsaw blade comprising:

an open-top sheath case including a floor, a pair of sidewalls and an end wall extending upwardly from said floor, and an open end between the pair of sidewalls for receiving the chainsaw blade;

a planar sheath cover detachably secured to the sheath case to cover the open-top of the sheath case;

the sheath cover including an "L" shaped lip extending inwardly along longitudinal edges of the sheath cover;

an open-top tool kit box including a floor, a pair of sidewalls and front and rear end walls extending upwardly from said floor;

the tool kit box further including an outwardly extending lip provided on the upper edges of the sidewalls and the front end wall;

the outwardly extending lip of the tool kit box sized to be slidably received by the inwardly extending lip of the sheath cover;

wherein a sidewall of the sheath case includes an outwardly extending catch member and further includes a resilient cord detachably attached to the catch member and configured to be attached to the chainsaw to resiliently secure the sheath and tool box combination to the chainsaw.

* * * * *